Figure 1:
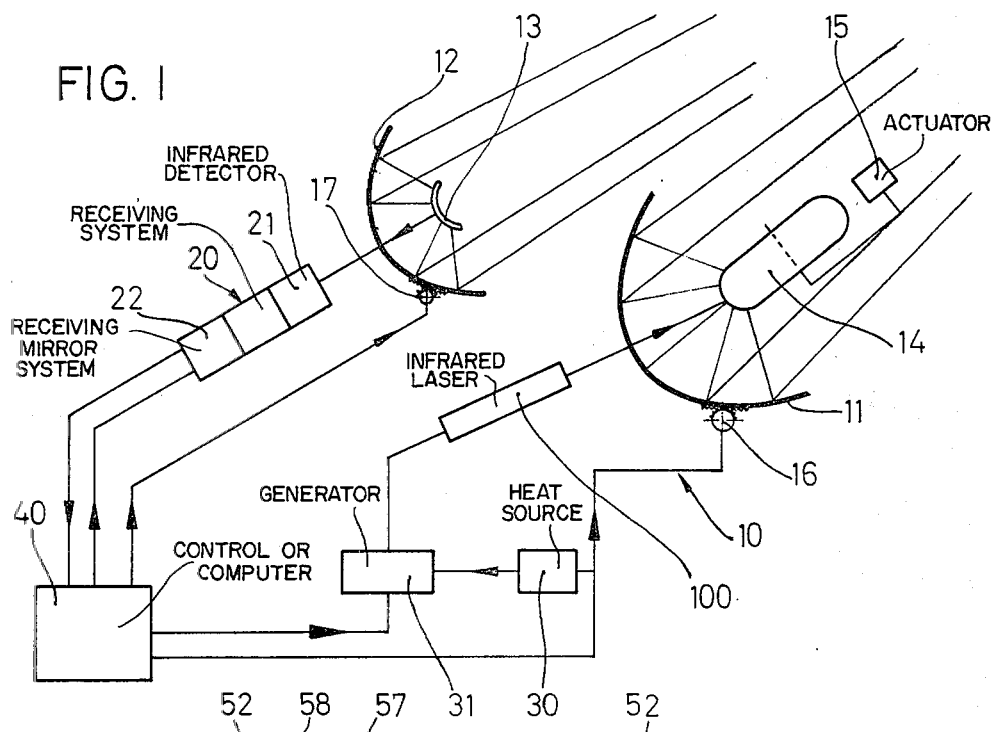

United States Patent [19]

Erben et al.

[11] 3,946,233
[45] Mar. 23, 1976

[54] WEAPON SYSTEM FOR THE DETECTION OF AND USE AGAINST STATIONARY OR MOVING OBJECTS

[75] Inventors: Klaus Dieter Erben; Walter Kroy, both of Munich; Walter Erich Mehnert, Ottobrunn, all of Germany

[73] Assignee: Messerschmitt-Bolkow-Blohm GmbH, Munich, Germany

[22] Filed: Mar. 18, 1970

[21] Appl. No.: 20,788

[30] Foreign Application Priority Data
Mar. 20, 1969 Germany............................ 1914250
Mar. 20, 1969 Germany............................ 1914251
Mar. 20, 1969 Germany............................ 1914252
Mar. 20, 1969 Germany............................ 1914253

[52] U.S. Cl.......... 250/347; 250/203 R; 331/DIG. 1; 356/4; 356/152; 89/1 A;
[51] Int. Cl.²........................ G01J 1/00; H01S 3/00
[58] Field of Search.... 331/94.5 A; 250/199, 203 R, 250/347; 219/121 L; 89/1 A 356/29, 4, 5, 152

[56] References Cited
UNITED STATES PATENTS

| | | | |
|---|---|---|---|
| 3,390,934 | 7/1968 | Berreman | 350/179 |
| 3,439,288 | 4/1969 | Mangin | 331/94.5 |
| 3,464,028 | 8/1969 | Moeller | 331/94.5 |
| 3,504,182 | 3/1970 | Pizzurro et al. | 250/199 |
| 3,545,862 | 12/1970 | Ackerman | 356/4 |

FOREIGN PATENTS OR APPLICATIONS
1,200,946   9/1965   Germany ........................... 331/94.5
704,017   2/1965   Canada............................. 331/94.5

OTHER PUBLICATIONS

Klass, "Power Boost Key to Feasibility," 8–1972, Aviation Week & Space Technology, pp. 32–40.
Vogel, "Lasers: Devices and Systems—Part III," 11–1961, Electronics, pp. 31,32.
Wieder et al, Physical Review Letters, 3–1966, Vol. 16, pp. 565–567.
Tiffany et al., Laser Focus, 9–1969, pp. 48–51.
Horrigan et al., "High Power Gas Laser," Final Technical Report, 9–1968, Raytheon Co., Cont. No. DA-AH01-67-1589.

*Primary Examiner*—T. H. Tubbesing
*Assistant Examiner*—S. C. Buczinski
*Attorney, Agent, or Firm*—Woodhams, Blanchard and Flynn

[57] ABSTRACT

Weapons system for both detection and affecting of stationary or moving objects. A laser beam is generated at a relatively low power level and caused to monitor, as by sweeping, a predetermined zone or space. Said laser beam or a portion thereof is reflected by and from an object appearing within said zone or space and is sensed by suitable detection means. The detection means provides the input to a computer which then locks the generator onto said object and simultaneously increases the power emitted therefrom to a predetermined higher, as destructive, value. Friendly objects operating within the same area can be caused to emanate a signal beam which is sensed simultaneously with the sensing of the reflected laser beam and prevents the actuation of the computer.

19 Claims, 7 Drawing Figures

WEAPON SYSTEM FOR THE DETECTION OF AND USE AGAINST STATIONARY OR MOVING OBJECTS

The invention relates to a weapon system for the detection and fighting of either stationary or moving objects, particularly missiles flying at supersonic speed. It is already known to have weapon systems in which detection equipment is coupled with separate fighting equipment, e.g., slave systems. For these purposes, mainly radar systems in the microwave range are used as detection equipment. Due to the relatively long wavelength, however, only a comparatively inaccurate detection of objects is possible since the detection sensitivity is a function of the wavelength which, in the known cases, is in the relatively high centimeter range. In addition, the known detection systems require use of large and heavy reflectors for the directional bunching of radar beams because the reflector diameter must be proportional to the wavelength of the beams used. Such detection equipment is associated with computers and remote guidance systems, etc., and connected with fighting equipment, e.g., rocket launchers, guns, etc., with the detection data controlling the weapons to be employed. However, these known weapon systems have numerous shortcomings. The complicated engineering required leads to a considerable reduction in flexibility of the weapons system. The measures for the steady and synchronous functioning of the completely different equipment for detection on the one hand and fighting on the other, are very extensive and costly.

It is the object of the invention to provide a weapon system whose detection equipment can at the same time be used as fighting equipment. This task is solved by the fact that in the 8–11 $\mu$ output wave range, a $CO_2$ infrared laser with reduced output powder provides, together with a detector, a suitable optical system and a computer, a detection unit for sensing and identification of stationary or moving objects, as well as determining the paths of the latter, at long to short range and, with full output power, provides a fighting weapon controlled by the computer. To obtain a high output power, in addition to carbon dioxide, gas additives, e.g., helium or nitrogen, can be used for operating the $CO_2$ infrared laser, and furthermore additives of rare carbon and oxygen isotopes can be used for changing the wavelength so as to attain ranges of extremely low atmospheric absorption.

These features lead to a considerable simplification in the engineering of the weapons system, remarkable increase in operational readiness and effect upon enemy targets and, in addition, eliminate the sources of trouble which have arisen in the past and which are to a great extent caused by the differences between the various kinds of detection and fighting equipment.

In detail, the invention suggests that the infrared laser consists of a folded optical system. In order to reduce the power output, it is possible to use only a small part of the system. At full power all discharge paths can be activated. This feature permits smaller size and increases the operational flexibility of the entire weapon system.

In order to make the highly amplified radiation of a laser operating at full output power useable in the weapon system according to the invention, the invention suggests that liquified gases, e.g., liquefied air or gas-liquid mixtures, be used for cooling the gas mixture employed as a laser gas and that the mirrors of the infrared laser resonator be cooled by means of liquefied gas or gas-liquid mixtures.

A special embodiment of the invention provides that the infrared laser be equipped with a double cylinder cathode and/or anode, and, to increase the infrared laser output power, that mirrors be used, made from material on which appropriate materials, preferably multilayered dielectrics, have been vapor-deposited.

For this purpose, a cathode is produced which effectively draws off the ions, without the beam path of the laser light between the mirrors being influenced by the device. This is achieved by having a double metal cylinder, preferably aluminum, with a large surface, arranged as a cathode. Furthermore, the invention provides that the double metal cylinder be hollow or that it have passages and that it be equipped with an adjusting screw for adjustments in elevation. These features permit on the one hand additional cooling and, on the other, symmetrical discharge along the laser discharge tube.

The invention suggests, as another measure to permit use of the full high-energy output radiation, that the infrared laser be provided with a highly reflecting, cooled rotating mirror for beam dispersion. This measure reduces the high energy density at the laser exit and considerably reduces surface loading on the transmitting mirror.

This mirror is a rotating body, the exterior of which has a reflecting coating of suitable vapor-deposited layers (preferably metal or dielectrics); it is preferably toroidal or spherical, rotated about a stationary axis by means of cooling agents, preferably liquid helium, flowing in under pressure. The incoming cooling agents are directed by vanes mounted on the interior surface of the rotating body with a reflecting coating; in a special version these vanes do not touch the interior surface of the mirror area. This measure distributes the energy absorbed by the mirror surface per time unit over a considerably larger area and keeps the heat buildup in the mirror body within controllable limits.

In addition, it is suggested that the gas used for cooling the mirror be used simultaneously as a bearing for the rotating body at the rotation axis. This measure ensures extremely smooth running and rotational precision.

One embodiment of the invention suggests that the rotation axis of the rotating body with exterior reflective coating be provided with several concentric and coaxial passages. The cooling agent, which flows in under high pressure, is preferably directed through the innermost passage, and the exhaust gases through the return channel, while the gases intended for the gas bearings are separately directed through the outer passage. This measure permits a space-saving design of the device according to the invention.

It is also suggested that the rotation axis have auxiliary starting bearings in the counter-bearing of the rotating body. Centering of the rotation axis is thus ensured at rest and during the starting period.

In addition, it is suggested that surrounding the inlet tube, another cylindrical jacket be provided at a certain distance therefrom, which delimits the vacuum chamber. Thus the cooling agent flowing in is thermally insulated against the environment. Furthermore, it is suggested that the inlet passage for the cooling agent and propellant terminate in a nozzle—preferably a ring nozzle—and that the inlet passage be mounted on the inside of the vacuum chamber by means of supporting webs.

Another measure of the invention which suggests that the entire rotating mirror arrangement be placed in a helium gas atmosphere with a specific pressure range or in a vacuum, also facilitates thermal insulation and prevents fogging of the rotating mirror.

As another specific measure for the advantageous use of a $CO_2$ infrared laser in a weapon system, the invention provides three dimensional positioning of the axis of the rotating mirror in relation to the laser axis, by means of actuators; furthermore, that for further changes of the focal distance and beam direction of the infrared laser system, a parabolic coolable transmitter mirror be provided, its position together with the rotation mirror being changeable in three dimensions by means of a computer.

In order to use the full output power of the laser, the invention provides a definitely dimensioned pressure drop tube at the beam exit instead of the beam exit window so far in use, and a pump attached to a stub at the pressure drop tube, for reducing the gas pressure from ambient air pressure to the laser resonator pressure.

It is suggested that, at the exit end, a gas plug of a suitable gas be placed in front of the laser resonator opening in a specifically dimensioned tube. Furthermore a pump stub with an attached pump is provided to produce a pressure drop along the tube from ambient air pressure of, e.g., about 760 Torr to the laser resonator pressure of, e.g., about 10 Torr.

In an advantageous way, the invention suggests that a highly transparent gas, e.g., nitrogen, be used for the gas plug.

Furthermore it is suggested that, in addition to a pump for the active laser gas, another pump be arranged for producing the gas plug and that this pump have a gas efflux device in front of the opening of the pressure drop tube. This measure permits pumping out hot laser gases without having them pass by the mirrors, so that excessive heating is avoided.

Furthermore, the invention provides that boundary layer combs be arranged at the opening of the pressure drop tube, producing light turbulence which is required for high fluid drag.

Thus, the invention provides that the weapons system consist of an infrared laser, a rotating mirror and a parabolic mirror as a transmitting system, to which a receiving system is connected consisting of receiving mirrors, detectors and amplifiers, coupled with a computer; the computer controlling the power supply of the infrared laser simultaneously controls the mirrors of the transmitting and receiving system and, in addition, this computer automatically switches the infrared laser to full power during target acquisition and focusing of the system upon the target object. These features result in synchronizing of the individual elements of the entire system according to the invention without additional control elements being required. the required times are thus considerably reduced. A specific embodiment of the invention provides that for detection, a small, dimensioned infrared laser controlled by the same computer be employed against the detected targets.

For the cases requiring particularly high output powers, the invention provides that several amplifier stages be connected behind the infrared laser.

Figure 2:
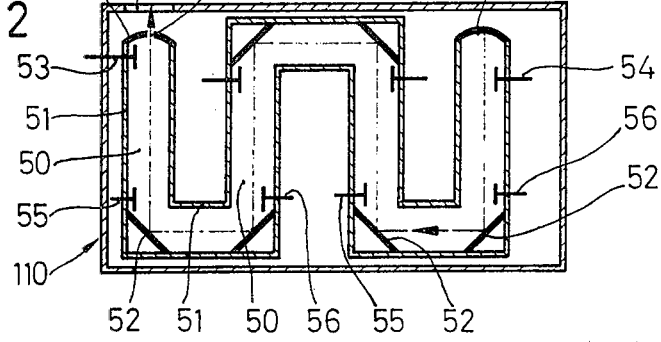
Figure 3:
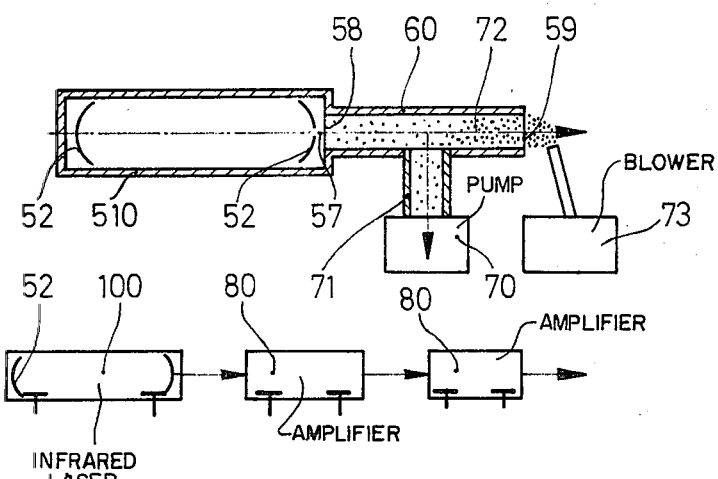
Figure 4:
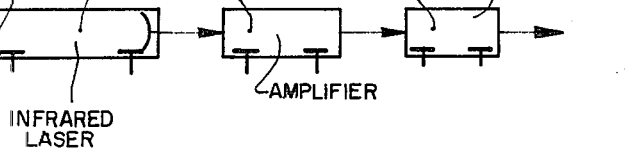
Figure 5:
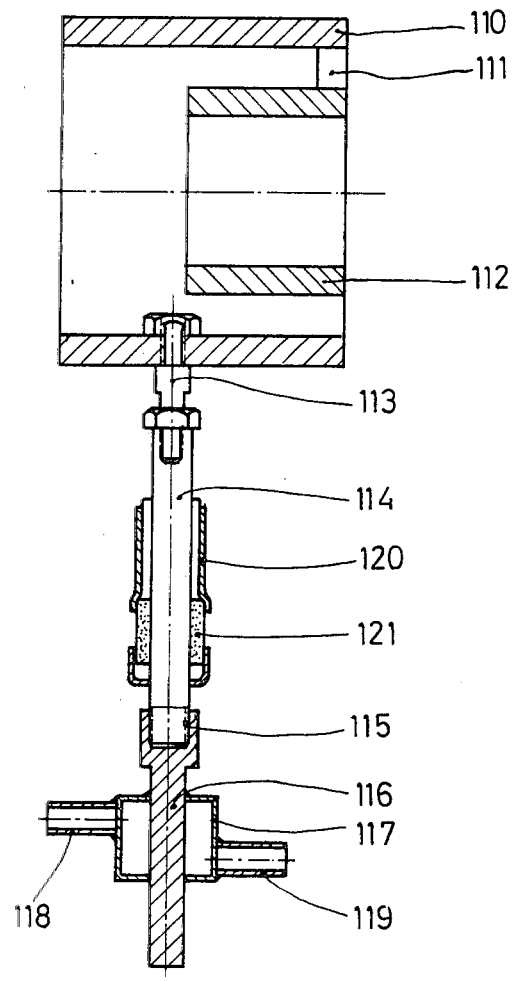
Figure 6:
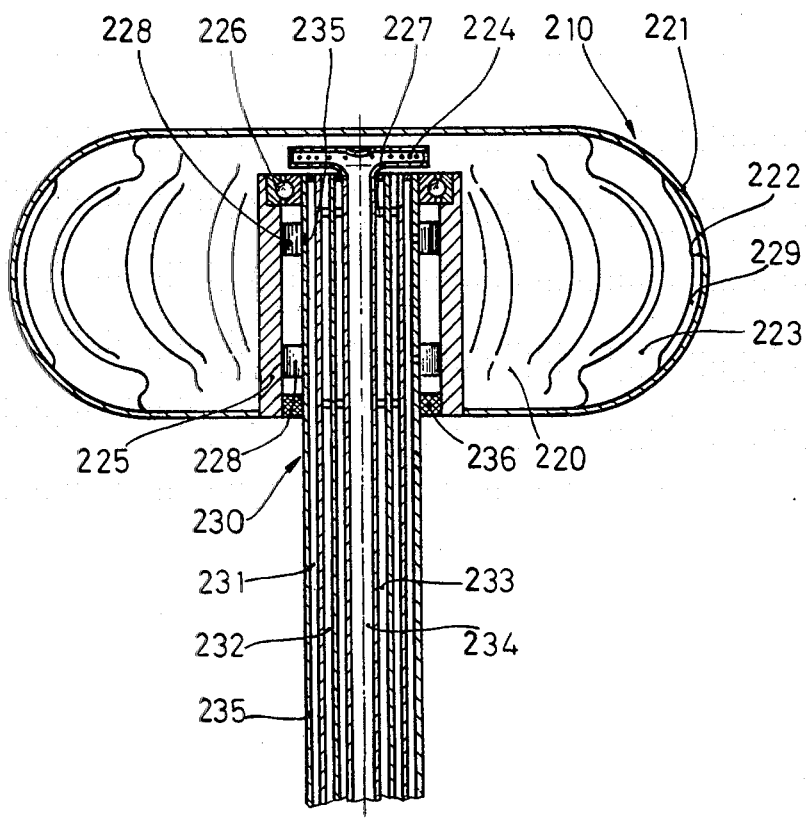
Figure 7:
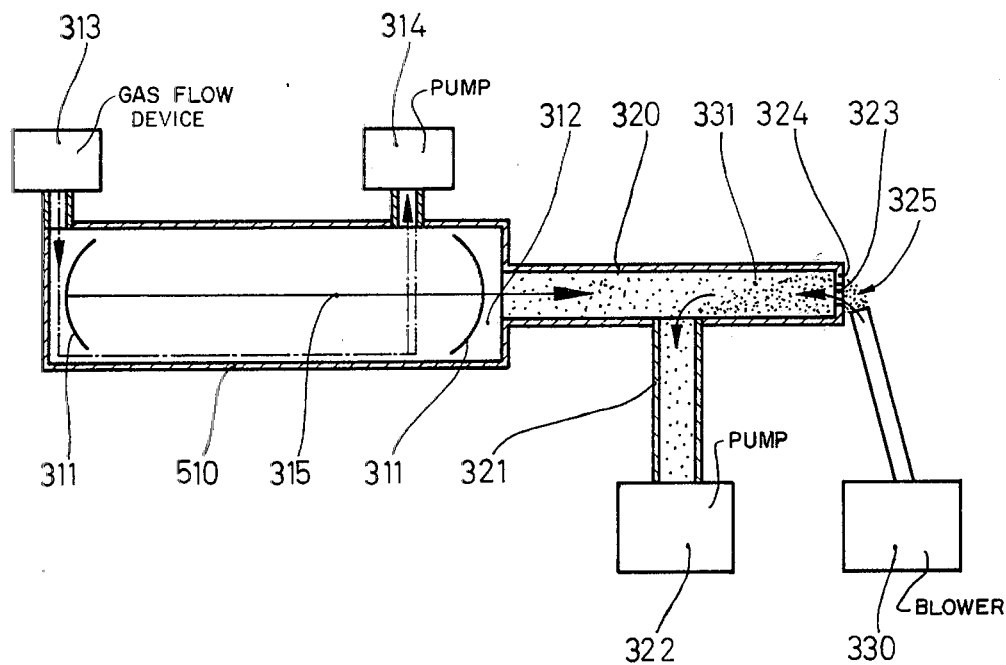

The invention is described and illustrated in the following so that further advantages and features of the invention can be understood. The figures show:

FIG. 1 a block diagram of the entire weapons system according to the invention,

FIG. 2 a diagram of a folded laser resonator,

FIG. 3 the schematic structure of a laser with pressure drop tube,

FIG. 4 the schematic structure of a laser with amplifying means,

FIG. 5 a section of the laser electrode according to the invention,

FIG. 6 a section of the rotating mirror according to the invention,

FIG. 7 a schematic diagram of the windowless termination of the laser resonator cavity.

A stationary or moving object is sensed by the infrared radar system consisting of the laser 100, 110, 210 operating at reduced power, the transmitting mirror system 11, 14 and the receiving mirror system 12, 13, coupled with a computer 40, which in turn controls the transmitting system 10 according to the values measured by receiver 20. The determination of the object's three-dimensional angle is performed by means of the position in space of the transmitting and receiving systems and the distance of the object is determined by measuring the propagation period of the laser light, which is preferably done by a modulation of the output beam with a function of time and a comparison of the received function with the modulated function.

To obtain a particularly favorable output wave range between 8 and 11 $\mu$ a $CO_2$ gas laser is used, the laser gas of which preferably contains rare carbon or oxygen isotopes; the beam emitted by such a laser, is scattered and absorbed to only a minute degree in the terrestrial atmosphere, even when the latter contains increased quantities of water vapor, carbon dioxide, dust or other particles. The employed infrared laser 100, 110, 210 serves at the same time for both a searching and detecting device as well as a weapon. This laser numbers among the laser devices which permit the highest possible power output, particularly when its active gas is improved by additives of nitrogen, helium, etc., in its activation and cooling mechanism. The invention permits this by having the laser cavity especially well cooled by means of liquid gases and liquid-gas mixtures, e.g., liquid helium or liquid nitrogen, to keep the active gas at low temperatures and to achieve a larger yield for the laser radiation.

In the embodiment of the invention shown in FIG. 1, the laser 100, operated at low power, emits infrared radiation which is directed to the search area by means of a mirror system consisting of a rotating mirror 14, possibly already rotating, and a parabolic mirror 11. The focal distance of the mirror systems and thus the divergence or convergence of the infrared light leaving the system is determined by the position of the rotating mirror 14 in relation to the laser axis and to the axis of the parabolic mirror 11, the mirror system being controlled by a computer 40.

When there is a target in this area, it reflects part of the incident radiation. Part of this strikes the receiving parabolic mirror 12 which directs this portion by means of an auxiliary mirror 13 onto an infrared detector 21. The latter is adjusted such that the backgound radiation is suppressed and it reacts only when an object is in the target area. Based on changes in the focal distance and movement over the solid angle coordinates of the receiving mirror system 20 and the determination of the distance of the object from the detection system by measuring the propagation period of the laser beam, the electronic computer 40 can instantly and with a high degree of accuracy locate the target object in the area and can determine its flight path. Then the computer 40 controls the transmitting system 10, until the focal point of the transmitting system with a sufficiently small focal spot is adjusted to the target.

This process is continuously monitored by the receiving system 20, and the transmitting system 10 is thus continuously corrected by the computer 40, until the measurements of position and flight path of the object, if same is continuously moving, have been computed with sufficient accuracy to coincide with the mirror control and adjustment of the focal length of the system. To prevent sensing of friendly targets they can be identified by having them continuously transmit a frequency which is recognized by the receiving system 20. After sensing and checking, such target objects are eliminated by the computer 40. In these cases, the computer signal for emitting the full output power of the infrared laser 100, 110, 210 can be blocked.

After an unidentified or enemy object has been detected and after its position and flight path have been determined, and after the laser transmitter system 10 has been adjusted and the rotating mirror 14 has been energized, the infrared laser 100 is switched to full power by the computer, e.g., from a 10 kW power during detection to 10 MW during continuous operation or to an even higher power in pulse operation of Q-switch operation. When a rotating mirror is used for the Q-switch position, power can be increased, e.g., from 10 MW to more than 100 MW. With sufficient refocusing by the transmitting mirror system 10, whose parabolic mirror diameter 11 determines the smallest focal spot diameter, this output power is sufficient to melt or vaporize, at the focal spot, any conceivable material regardless of wall thickness, within fractions of a second, and at long ranges.

As the output radiation of the laser is propagated into space at the velocity of light, even targets at long range can be destroyed with extreme speed, almost immediately after identification, while in all systems so far used, e.g., rocket defence systems, the time elapsing until destruction of the target, became relatively long due to the time involved between detection, determination of the flight path, rocket launching and attainment of maximum velocity. The velocity of light is higher by a factor of at least $10^5$ than the speed of the rocket; thus, the invention permits a considerably shorter time period between detection, determination of the path and destruction of the hostile object. At the same time, it becomes possible that, e.g., a great number of approaching hostile objects can also be detected and destroyed even far beyond the frontiers of one's own country.

To make the system independent of electrical supply networks, which are susceptible to trouble, the invention provides that a heat source 30 with a sufficiently high output power, e.g., $10^9$ W, be used, the energy of which is converted into electrical energy, e.g., via steam turbines or MHD generators 31. To obtain the required output energy of 1 MW, the laser discharge tube must be very long. However, to obtain a relatively short total length, it is advisable to install a folded system.

FIG. 2 is a diagram of an embodiment of the invention. In the folded optical laser system, each portion of the laser cavity can be used as a path of discharge 50. In addition to compactness this also permits variable output power by energizing different ones of partial paths of discharge, depending upon whether two, three or four, etc., of the partial paths of discharge 50 are energized.

FIG. 2 shows the schematic structure of such a laser system. The resonator cavity with its beam exit window 58 encloses so-called partial paths of discharge 50 limited by gas flow guide walls 51 and equipped with mirrors 52 at the two ends. At the front end of the overall system, there is a main anode 54, preferably a double cylinder anode, which has an intermediate cathode 56 at the end of the partial path of discharge 50. The latter has an intermediate anode 55 at the end of the next partial path of discharge 50 and so on, continuously, to the main cathode 53 at the beam exit window 57. The intermediate anodes 55 and intermediate cathodes 56 can also be designed as double cylinders.

Another advantage of this embodiment is the cooling to obtain low wall temperatures of the laser discharge tube, such cooling being more easily obtained by this embodiment.

FIG. 3 shows an embodiment of a laser in which the exit window 58, normally used for laser radiation, has been replaced by an open tube 60 for the pressure drop from ambient air pressure of about 760 Torr to the laser resonator pressure of, e.g., about 10 Torr, in order to prevent absorption by the window material. For this purpose, a tube, open at both ends is used, the inside width and length of which have been determined by aerodynamic calculations. Attached to this pressure drop tube 60, in the vicinity of the end facing the laser resonator, is a stub tube 71 with an attached pump 70 having a high suction capacity. This pump 70 generates a high gas velocity between the ambient atmosphere and the stub tube 71. With an appropriate pumping capacity, the aerodynamic resistance in the pressure drop tube 60 reduces the atmospheric pressure at the outside end 59 with respect to the laser end 58 to at least the operating pressure in the laser generator. This prevents the surrounding air from penetrating into the resonator and degrading the performance of laser 210.

This design according to the invention results in a laser 510 without windows, which, due to the gas plug 72 in the pipe opening, eliminates any absorption losses as the laser light leaves the resonator. The gas plug 72, consisting of a gas with high transparency in the wavelength range of the laser, e.g., nitrogen, is generated by a gas efflux device 73 in front of the opening 59 of the pressure drop tube 60 associated with pump 70. Provided a gas is selected which is suited to the laser wavelength, little or no scattering of the laser light occurs in the rapidly flowing gas of gas plug 72 in pressure drop tube 60.

Also falling within the scope of the invention are all devices which have smaller dimensions and reduced output and are mounted on vehicles or in stationary installations and are used against close targets. Here, infrared radar detection may possibly be dispensed with and visual or microwave detection equipment may be used. Visual detection has, however, the disadvantage of high atmospheric attenuation and absorption. In the presence of cloud layers, failures, can be expected even at short ranges. Radar detection has the disadvantage that owing to the long wavelength, it may not be sufficiently accurate, even when large transmitting reflectors are used. Also included within the scope of the invention are arrangements in which the mirrors 11, 12 are stationary, both at the transmitter and the receiver end and in which only the auxiliary mirror 13 and rotating mirror 14 are moved in three dimensions by the computer 40.

In the embodiment of the invention shown, the computer 40 controls parabolic mirrors 11, 12 by means of actuators 16, 17, while the rotating mirror 14 is controlled by means of actuator 15 and also obtains its control pulses from the computer. The auxiliary mirror 13 can also be provided with a separate actuator, not shown.

FIG. 4 shows an embodiment of the invention for a further increase of the laser system output power, characterized in that an infrared laser 100 is followed by amplifier stages 80, preferably consisting of mirror-less discharge paths and preferably operated by the same gas mixtures as the laser itself.

The advantage is that laser mirrors 52 are subject to a smaller surface loading and, by increasing the laser light intensity in the subsequent stages, a very high output is obtained. The laser light entering the amplifier stages 80 is intensified by stimulated emission. By means of this procedure, is it possible, in a laser system as described above, to add a series of amplifier stages 80 to a laser 100 and, in this way, to exceed the performance of a single laser, which is limited due to mirror loading and heat buildup. The following describes details of the invention. FIG. 5 shows the laser electrode.

In a cylindrical tube 110, a second cylindrical tube 112 with a smaller diameter is supported by means of webs 111. Both tubes are preferably made from aluminum and form a double cylinder cathode.

The latter is attached by means of an adjusting screw 113, to a support pin 114. The support pin is a part of the high tension line and its end is provided with threads 115. The threads are used to attach the support pin to bolt 116 which is made from a material with good thermal conductivity and is enclosed wholly or partially by a small cooling jacket 117. This cooling jacket 117 is provided with intake and discharge stube tubes 118 and 119, respectively, for the cooling agent. Compressed air is suggested as a preferable cooling agent. The numeral 120 designates the sleeve of the high tension line and 121 is the insulation. Due to the glow discharges which can be achieved by means of such double cylinder electrodes and which effectively activate the laser gas, it is possible to obtain the very high efficiency and output capacities required, e.g., for a weapon system with $CO_2$ laser. Also due to the steady glow discharge a constant output can be obtained, which is required for a laser detection system or a laser communication system.

The use of mirrors for high intensity light sources requires a cooling system. Water cooling is no longer sufficient for extremely high intensities such as may occur, e.g., in laser applications, preferably a high energy $CO_2$ gas laser. According to the illustrative embodiment of the invention, a rotating mirror is placed in the laser beam. Due to the rotation of this mirror, the energy absorbed by the mirror per unit of time is distributed over an area considerably larger than that of the beam cross section. The factors which determine the area over which the incident energy is distributed are, in addition to the laser beam cross section, the rotational speed and diameter of the mirror.

FIG. 6 shows an illustrative embodiment of this mirror. This mirror is formed by a hollow rotating body 220 which is preferably toroidal or spherical and the outer surface 221 of which has a reflecting coating of suitable vapor-deposited layers, preferably metals or dielectrics. At the interior surface 222 of the hollow rotating body 220, deflection and guide vanes 223 are provided. These vanes deflect the gas for cooling hollow rotating body 220. This gas flows in under pressure by means of the ring nozzle 224, and is fed back into the gas return passage 233. To improve the cooling of the mirror area a gap 229 is left between the guide vanes and the interior surface of the mirror areas to ensure a good flow of the cooling agent over this interior surface.

The hollow rotating body 220 has a counterbearing 225 for the rotation axis 230. At the upper end of the counterbearing 225, auxiliary starting bearings, preferably antifriction bearings, have been arranged, in which the end of the tube axis is supported. The rotation center 230 consists of various tubes with different diameters, which form concentric, coaxial passages 231, 232, 233, 234. The innermost passage 234 is used to feed under pressure, the cooling agent and propellant into the hollow rotating body 220. The end of this tube is provided with a nozzle 224, preferably a ring nozzle. By means of webs 227, this feed passage 234 is connected with a second tube which forms a vacuum chamber 232. Thus an especially good and simple thermal insulation is provided for the incoming cooling agent, against the ambient temperatures. Another tube with a larger diameter is also connected by webs 227 about this vacuum chamber, forming the return passage for the gas. This tube is enclosed by the rotation axis envelope, forming a passage 231 in which the gaseous coolant is also fed under high pressure to the nozzles 235 for the gas bearing 228. Gas bearing 228 or its volume is sealed against the ambient air by means of retaining ring 236.

The hollow rotating body 220 is rotated rapidly by the cooling agent, preferably a gas liquid mixture flowing out of the ring nozzle 224 which while vaporizing, strikes the guide vanes 223 mounted at the inside 222 of the hollow rotating body 220.

When the hollow rotating body exceeds a certain minimum rotational speed, the gas bearing 228 assures exact centering and guidance of the rotation center 230 and lifts it from the auxiliary starting bearing(s). Thus, any bearing unbalance is prevented and absolutely smooth running and rotational precision are obtained. This effect is accentuated by the gyroscopic action of the hollow body.

The coolant flowing past the guide vanes 223 cools the inner wall of the mirror 222 to very low temperatures and is drained off via the return passage 233 through the rotation center 230 and is then scavenged for reuse. This scavenging system, which is not shown in the figure, also pumps the gas mixture in the required quantity into the gas bearings 228 by means of a pressure device. The supply channel 231 with inlet nozzles 235 serves for this purpose.

FIG. 7 shows another detail of the invention as shown in FIG. 3.

The laser resonator cavity 510 has a tubular body 320 of specific and suitable dimensions rather than the window normally used. This tubular body 320 has a stub tube with an attached pump 322, of a size determined by the aerodynamic resistance in the tubular 320; this pump causes the gases 325 drawn in at the opening 323, to undergo a pressure drop along body 320. This drop goes from ambient air pressure of, e.g., about 760 to the laser operating pressure, e.g., about 10 Torr, provided individual components are appropriately dimensioned. Therefore body 320 will hereinafter be referred to as pressure drop tube 320.

At certain wavelengths of the laser beam 315 which are attenuated in the atmosphere, it is advantageous to avoid pumping air through the pressure drop tube 320. Instead, a device 330, e.g., a blower, blows a gas in front of the opening 323 of pressure drop pipe 320. This gas is highly transparent, preferably in the laser wavelength range. It is then drawn through the pressure drop tube 320 by means of a pump 322, which thus forms a steady gas plug 331. These features which specify a certain type of gas in the pressure drop tube 320, have the advantage that, due to a slight interaction of the laser light 315 with this gas, no additional scattering and absorption take place in the highly turbulent gas atmosphere in pressure drop tube 320. To generate high turbulence in this pressure drop tube 320 more rapidly, the opening is provided with suitable means, e.g., boundary layer combs 324 whose function is to prevent a laminar flowing boundary layer on the wall of the pressure drop tube 320 and to cause rapid formation of high turbulence in the flowing gas.

The invention covers all arrangements which prevent the formation of laminar flow boundary layers, e.g., baffle plates, deflection grids, counterflow blasts, etc. The laser resonator cavity with its mirrors 311 is provided with a gas flow device 313 and a pump 314 which is arranged in front of the outlet mirror and pumps the inflowing laser gas out of the resonator cavity so that the hot laser gases need not pass by the mirrors. In this way, the mirrors are not subjected to high temperatures.

The embodiments of the invention in which an exclusive property or privilege is claimed are defined as follows:

1. A system for detecting the presence of and inflicting damage on a stationary or moving object, comprising:
    controllable carbon dioxide gas infrared laser means for producing an output beam of infrared radiation in the wave range of 8 to 11 microns, the magnitude of power contained in said output beam being controllable between a low output power level for a scanning and a high output power level for inflicting damage;
    adjustable lense means in the path of said infrared radiation for controllably directing said infrared radiation for scanning a given zone;
    detector means for locating said object in said zone by detecting infrared radiation reflected from said object and producing a signal;
    control means for (1) effecting an adjustment of said adjustable lense means in response to said signal to maintain a directing of said infrared radiation at said object and for (2) effecting a change of the power level of said laser means from said low power level to said high power level to inflict damage on said object.

2. A system according to claim 1, wherein said controllable laser means comprises means defining a folded optical system having first and second parts, said first part producing said low power output beam and said first and second parts combined producing said high power output beam.

3. A system according to claim 2, wherein said first and second parts of said controllable laser means includes means defining an anode and a cathode, one of said anode and cathode having a first cylinder and a second cylinder located internally of said first cylinder to define a double cylinder, and further including means for supporting said one of said anode and cathode adjacent the carbon dioxide gas of said carbon dioxide gas laser means.

4. A system according to claim 1, including means for cooling said infrared laser means.

5. A system according to claim 1, wherein said adjustable lense means comprises means defining a parabolic mirror and a body having a reflective surface of rotation at the focal point of said parabolic mirror.

6. A system according to claim 5, wherein said body is hollow and includes means supporting said body for rotation.

7. A system according to claim 6, wherein the interior surface of said hollow body has a plurality of guide vanes thereon and wherein said support means includes means for supply a coolant agent to the interior of said hollow body and nozzle means for directing said coolant agent on said guide vanes to thereby effect a driving rotation of said hollow body.

8. A system according to claim 7, wherein said hollow body is of a torroidal shape.

9. A system according to claim 7, wherein said supply means on said support means is adapted to function as a bearing for said hollow body when said coolant agent is utilized for driving said hollow body.

10. A system according to claim 7, wherein said support means further includes support bearings for permitting said hollow body to start rotation upon an initial application of said coolant agent thereto.

11. A system according to claim 7, wherein said coolant agent is a gas.

12. A system according to claim 7, wherein said coolant agent is a gas and liquid mixture.

13. A system according to claim 7, wherein said support means comprises a hollow sleeve member extending into the interior of said hollow body to thereby define the axis about which said hollow body is rotated; and
    wherein said supply means comprises a plurality of concentric hollow sleeves extending internally of said sleeve member and into said hollow body, said cooling agent being transmitted to the interior of said hollow body through the central one of said concentric sleeves and said cooling agent being exhausted from said hollow body between said central one of said concentric sleeves and at least one of said plurality of sleeves.

14. A system according to claim 13, wherein said nozzle means is mounted on the inner end of said central one of said concentric sleeves.

15. A system according to claim 7, wherein said lense means includes actuator means for adjusting the location of said hollow body relative to said focal point of said parabolic mirror.

16. A system according to claim 15, wherein the operation of said actuator means is controlled by said control means.

17. A system according to claim 16, wherein said adjustable lense means further includes means for supporting said parabolic mirror for movement to permit said directing of said infrared radiation at said object in response to said control means while said object is moving.

18. A system according to claim 17, wherein said detecting means comprises a receiving mirror system for detecting said infrared radiation.

19. A system accoring to claim 1, wherein said infrared laser means includes means defining a pressure drop tube concentrically encircling the axis of said output beam at the output end of said laser means; and further including blower means for blowing a gas across the open end of said pressure drop tube means; and further including pumping means for generating a pressure drop in said pressure drop tube means to define a gas plug.

* * * * *